US006839649B2

(12) United States Patent
Kreider

(10) Patent No.: US 6,839,649 B2
(45) Date of Patent: Jan. 4, 2005

(54) HARDWARE DEVICE TESTING WITH FAST ABSTRACT SCRIPTING TOOL

(75) Inventor: Thomas R. Kreider, Mesa, AZ (US)

(73) Assignee: Honeywell International Inc., Morristown, NJ (US)

(*) Notice: Subject to any disclaimer, the term of this patent is extended or adjusted under 35 U.S.C. 154(b) by 132 days.

(21) Appl. No.: 10/199,183

(22) Filed: Jul. 19, 2002

(65) Prior Publication Data

US 2004/0015315 A1 Jan. 22, 2004

(51) Int. Cl.$^7$ .................................................. G06F 9/00
(52) U.S. Cl. ...................................... 702/122; 702/123
(58) Field of Search ...................... 703/20–22; 702/119, 702/122, 108, 123, 188, 182–186; 714/37, 38, 43, 44, 48, 25, 27, 32, 35, 712; 717/115, 120, 121, 123, 124, 139

(56) References Cited

U.S. PATENT DOCUMENTS

| | | | |
|---|---|---|---|
| 5,223,788 A | * 6/1993 | Andreano et al. | 714/25 |
| 5,954,829 A | * 9/1999 | McLain et al. | 714/712 |
| 6,067,639 A | * 5/2000 | Rodrigues et al. | 714/38 |
| 6,219,626 B1 | * 4/2001 | Steinmetz et al. | 702/183 |
| 6,279,124 B1 | * 8/2001 | Brouwer et al. | 714/38 |
| 6,282,699 B1 | * 8/2001 | Zhang et al. | 717/109 |
| 6,405,149 B1 | * 6/2002 | Tsai et al. | 702/119 |
| 2001/0011370 A1 | * 8/2001 | Gunter et al. | 717/4 |
| 2003/0061292 A1 | * 3/2003 | Underseth et al. | 709/206 |
| 2003/0191590 A1 | * 10/2003 | Narayan et al. | 702/68 |

OTHER PUBLICATIONS

Translation of the Product Description for the MoTest Testing System, 2001.*

Partial Translation of the Product Description for the MoTest System, 2001, sections 1, 1.1, 2.1, 3, 3.1, figure 2–1.*

Anonymous, "MoTest Prusystem; Ausfuhrliche Produktbeschreibung," 'Online!. 2001, retrieved from the Internet: <URL: http://www.itm.tum,de/forschung/ast/eq/Tools/MoTest/MoTest_Info.pdf>, paragraph '0003!; figures 2–1, (No month).

Anonymous, "ADS2 Avionics Development System; Product Overview," 'Online! Apr. 2002, retrieved from the Internet: <URL: http://217.6.59.26/download/ads/ADS2–Overview_pres.pdf>, p. 9, 13, 20, 23, 27.

Flick, C. Allen et al, "Using TCL/TK for an Automatic Test Engine," Proceedings of the Sixth Annual TCL/TK Workshop, 'Online!, retrieved from the Internet: <URL: http://www.usenix.org/publications/library/proceedings/tc198/full_papers/flick/flick.pdf> the whole document, 1998.

* cited by examiner

Primary Examiner—Hal Wachsman

(57) ABSTRACT

A method and system for programmically communicating with a hardware device under test enables a user to develop flexible and customizable test and simulation programs for hardware devices connected to an industry standard bus. Input test commands are interpreted via a project specific support code component written in a scripting language such as Tcl. An extended scripting language tool provides communications capabilities to the industry standard bus and therefore enables test commands to be transmitted over the industry standard bus subsequent to the communications capabilities being provided to the industry standard bus via the extended scripting language tool. The hardware device is then driven based on the project specific test commands interpreted through the extended scripting language tool and transmitted over the industry standard bus.

11 Claims, 4 Drawing Sheets

HARDWARE DEVICE TESTING WITH FAST ABSTRACT SCRIPTING TOOL

STATEMENT OF GOVERNMENT INTEREST

The U.S. government has certain rights in this invention.

BACKGROUND OF THE INVENTION

1. Field of the Invention

The present invention relates to bus communications, and specifically to a software tool for generating bus traffic for simulation, test and end-use applications by integrating a scripting programming language with bus-specific functionality.

2. Description of Related Art

A military standard 1553 (Mil-Std-1553) bus is a serial bus developed to facilitate intra-component communications aboard high performance aircraft, tanks, spacecraft, missiles and other networked vehicles. As is well known, bus traffic on a Mil-Std-1553 bus conforms to a packetized message protocol that provides fixed start/stop times, message addressing, message length, formatting, arbitration, and the like.

Conventionally, an end user tests or simulates operation of a hardware device ported on a Mil-Std-1553 bus by compiling and running a software test application, or project, that transmits test command messages to the hardware device over the Mil-Std-1553 bus. Because the end user must typically handle details of the packetized message protocol through, for example, a low level programming language such as C to enable the command messages to control the ported hardware device, a user must typically rewrite and recompile a significant portion of the project code each time a new hardware device type is ported to the Mil-Std-1553 bus for testing.

Attempts have been made to develop software scripting tools that abstract the Mil-Std-1553 driver layer in order to test hardware devices such as avionics data points under simulated operating conditions. However, such tools are limited in their programmability and can therefore not be easily re-targeted for use in testing different types of Mil-Std-1553 devices without requiring a significantly amount of rewriting and recompiling of the source code of the tools. In addition, such tools are often highly complex due to the rather generic form they must take to accommodate all possible uses. Therefore, the scripting tool, and consequently the device tests, is difficult to run from the end user's perspective because each test presents a user with a new interactive experience.

SUMMARY OF THE INVENTION

In view of the above, the present invention provides a method and system for programmically communicating with a hardware device under test to enable a user to develop flexible and customizable test and simulation programs for various types of hardware devices. Input test commands are interpreted via a project specific support code component written in a scripting language. An extended scripting language tool provides communications capabilities to an industry standard bus and therefore enables test commands to be transmitted over the industry standard bus subsequent to the communications capabilities being provided to the industry standard bus via the extended scripting language tool. The hardware device is then driven based on the project specific test commands interpreted through the extended scripting language tool and transmitted over the industry standard bus.

The extended scripting language tool enables the project specific support code component to communicate with the industry standard bus and at the same time enables the specific test project to appear as a simple function call to the end user. In addition, the extended scripting language tool need not be reconfigured and recompiled when a new type of hardware device is ported to the industry standard bus or when an additional functional feature is added to the project.

BRIEF DESCRIPTION OF THE DRAWINGS

Other objects and advantages of the present invention will be more readily apparent from the following detailed description of preferred embodiments thereof when taken together with the accompanying drawings in which.

DETAILED DESCRIPTION OF THE PRESENT EXEMPLARY PREFERRED EMBODIMENT

Figure 1:
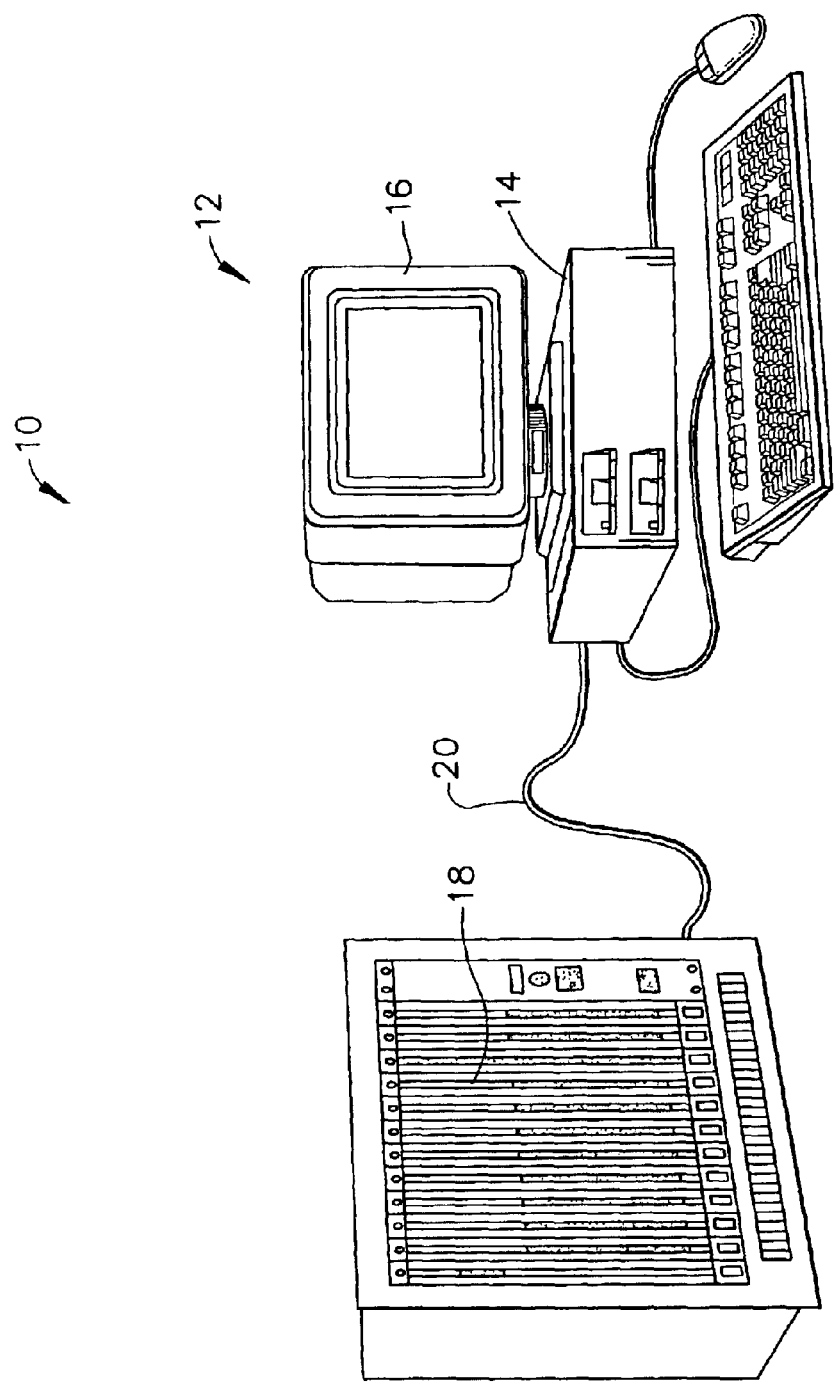
FIG. 1 is a hardware block diagram of a test environment in which a preferred embodiment of the fast abstract scripting tool according to the present invention may be implemented.

Referring now to the drawings in which like numerals reference like parts, FIG. 1 shows an exemplary hardware block diagram of a test environment 10 in which a preferred embodiment of the hardware device testing system and methodology according to the present invention may be implemented. The test environment 10 includes a testing computer 12, such as a personal computer, that includes a hard drive 14, a keyboard 15 and a display 16, and that is capable of running a Windows-based operating system. The test environment 10 also includes a hardware device under test (DUT) 18 connected to the testing computer 12 via an industry standard bus, such as a Mil-Std-1553 bus 20. As will be discussed in more detail below, the hard drive 14 stores several customized software components and a scripting language, such as the open source Tcl/Tk scripting language, that together enable flexible and customizable test and simulation programs to be developed for the DUT 18.

The DUT 18 may be, for example, a control moment gyro (CMG) of the type built by Honeywell, Inc. for use on satellites for pointing and stabilization, or any other hardware device capable of being ported to an industry standard bus, including avionics data points such as avionics displays, pilot joysticks and engine and wing actuators. In addition, the DUT 18 may alternatively represent a simulated device, such as the above-mentioned CMG or a multiplexor-demultiplexor (MDM) computer of the type manufactured by Honeywell, Inc. and used in the International Space Station and the Space Transportation System (Space Shuttle), or any other type of device being developed for use on an industry standard bus.

The Mil-Std-1553 bus 20 is a serial bus developed for intra-box level communication aboard high performance aircraft, tanks, spacecraft, missiles and other networked vehicles. As is well known in the art, the Mil-Std-1553 bus defines the communications protocol through bus or nodes (not shown) for two devices communicating over the Mil- Std-1553 bus. The bus controllers selectively transmit packetized bus control messages to respective ported hardware devices control variables such as high/low voltage settings for attached devices, message formatting, differential/base clock rates, electrical and timing specifications, bit width and spacing, message length and spacing, and bus arbitration and usage parameters as is well known in the art.

As will be discussed below, the hardware device testing system of the present invention may be modified to support simulation or test applications over other industrial interfaces such as, for example, an IEEE-488 or CAN bus. While only the bus cabling of the Mil-Std-1553 bus 20 referenced above is shown in FIG. 1, it will be appreciated that the Mil-Std-1553 bus 20 also includes a bus card (not shown) in the testing computer 12 for interfacing the bus cable with the computer 12 as is well known in the art. In addition, while the bus cable is shown as branching to the single DUT 18, the bus cable when implemented in an actual operating environment is configurable to connect, in the case of a Mil-Std-1553 bus, up to 32 hardware devices as is well known in the art.

Figure 2:
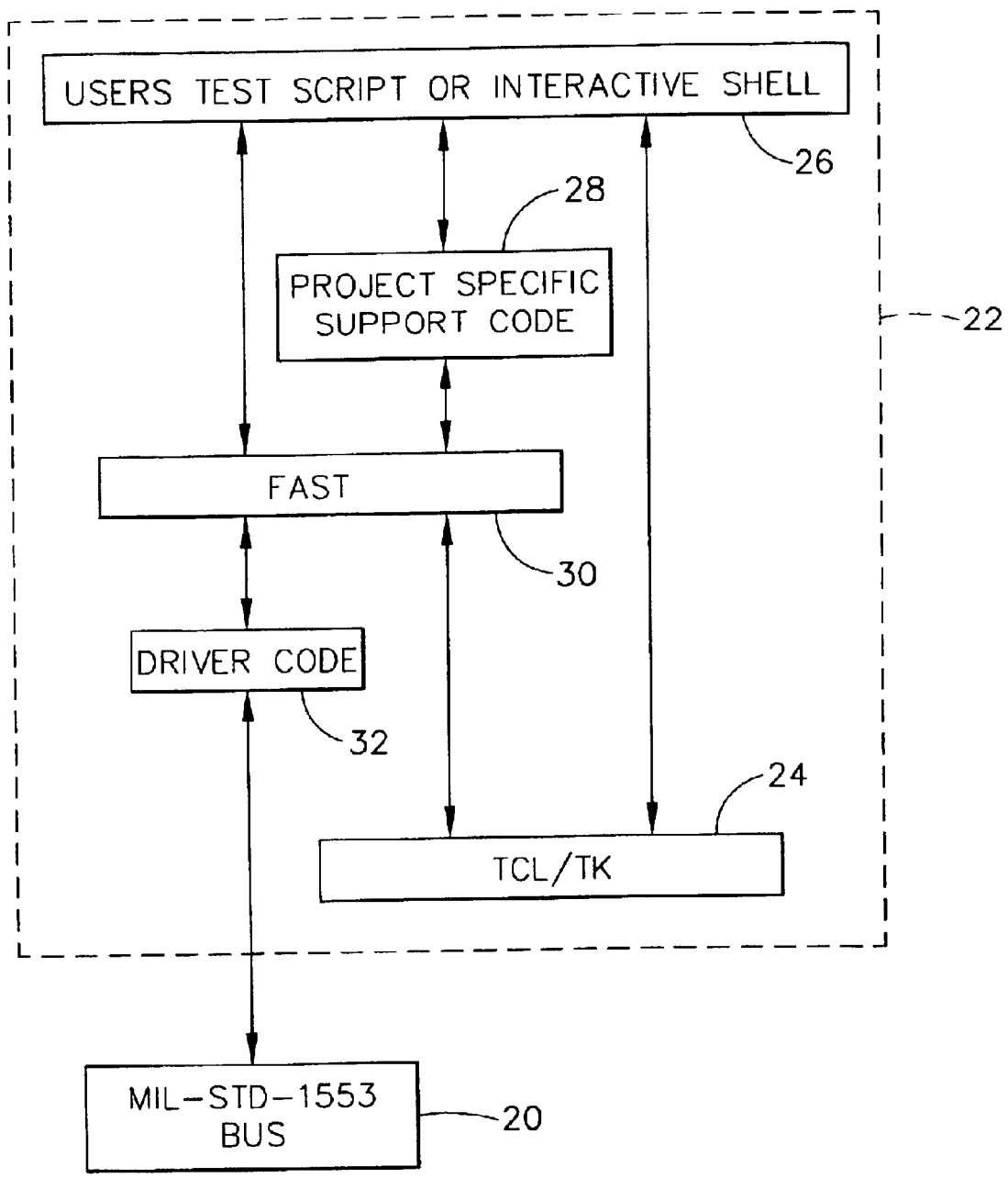
FIG. 2 is a software block diagram of the software modules necessary to implement a test and simulation environment for Mil-Std-1553 hardware devices.

FIG. 2 shows generally at 22 the software components of the hardware device testing system according to the present invention. The software components 22, which are programmed into the hard drive 14 of the computer 12, include a scripting language component 24 stored in an executable file on the hard drive 14. The scripting language component 24 creates a programming environment for the other components and preferably is the open source, industry accepted and commercially supported scripting language Tcl/Tk that enables certain of the other components to be written and executed. Specifically, the users test script or interactive shell component 26, the project specific support code component 28, and the fast abstract scripting tool (FAST) 30 are written in Tcl/Tk code. Each of these components, as well as the driver code component 32, represents a different layer of programming abstraction, and enables a user to break up a set of details of a test or simulation application or project that would be otherwise difficult to manage into manageable subsets of details.

The users test script or interactive shell component 26 represents a user interaction layer in which a user may program test commands onto the hard drive 14 as ASCII text files, or may interactively enter test commands via the keyboard 15 and through either a simple text-based user interface or a more complex GUI (not shown) on the display 16.

The project specific support code component 28 represents a project specific layer in which a library of function calls are written in Tcl/Tk script and are stored on the hard drive 14 as Tcl files for use specifically in testing DUTs of like type, such as the DUT 18. The project specific support code component 28 is analogous to the text of a conversation in that it takes a request for a solution, such as test commands input through the users test script or interactive shell component 26 and, by communicating with the DUT 18 or other component on the Mil-Std-1553 bus 20 through the FAST 30 and the driver code component 32, provides the solution. Based on input test data and on test information programmed therein, the project specific support code component 28 may send and receive message traffic on the Mil-Std-1553 bus 20, display test information on the display 16, write to files such as logging files on the hard drive 14, and perform numeric conversions to support translation from machine code to human readable text and numbers.

The FAST 30, which will be discussed below in greater detail, represents a protocol, or language specific, layer including a library of utilities or functions written primarily in Tcl/Tk that enables the project specific support code component 28 to communicate with the driver code component 32 regardless of the particular test or simulation application or project programmed into the project specific support code component 28. In other words, the FAST 30 bridges communication between the project specific support code component 28 written in Tcl/Tk and the driver code component 32 compiled in a language such as assembly or C, thereby providing a higher context for communication with the driver code component 32 than if it was necessary to write directly to the driver code component 32 from the project specific support code component 28.

In addition, the FAST 30 hides, or abstracts, implementation of the details of the Mil-Std-1553 bus messaging protocol from end users and application programmers without sacrificing functional capability, and is easy to extend, modify and support multiple projects without significant modification. Therefore, due to implementation of the FAST 30, communication to the DUT 18 appears to an application user as a simple function call rather than as a complicated process in a manner analogous to the manner in which the World Wide Web simplifies HTML, Ethernet and packet switching network communications. A user of the World Wide Web interacts with a simple to use, rich program called a browser, and everything that is behind the scenes, (HTML, Ethernet, packet switching networks) is transparent to the end user. With the preferred embodiment of the present invention, the test user and the test script itself sees a rich, capable environment and is not exposed to the underlying operations being executed.

The driver code component 32, which is written in pre-compiled machine code and is typically provided by a vendor of the communications bus card (not shown), represents a hardware specific layer that communicates the commands initially entered at the users test script or interactive shell component 26 to the DUT 18 over the Mil-Std-1553 bus.

Figure 3:
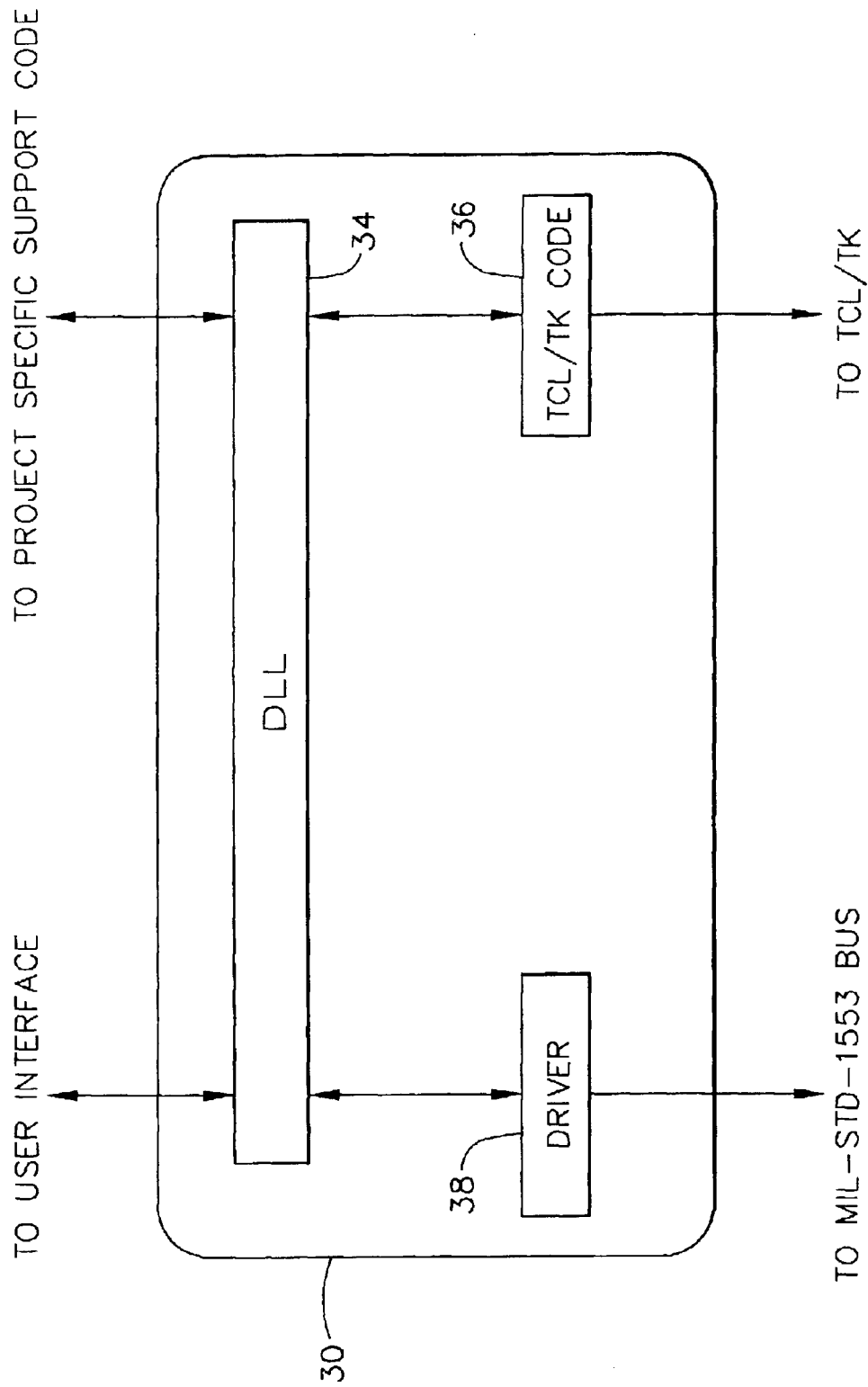
FIG. 3 is a block diagram showing the fast abstract scripting tool of FIG. 2 in greater detail.

As shown in FIG. 3, the FAST 30 includes three primary components: a Windows dynamic link library, or DLL 34; a scripting software code block 36; and a driver layer 38. The DLL 34 is for abstracting a transport and driver layer of the Mil-Std-1553 bus, and can be built upon by a user though use of the scripting software code block 36 to provide generic support for creation, logging and timing of Mil-Std-1553 bus message transactions. More specifically, a user can create a script of Tcl/Tk code, i.e., the project specific support code component 28, using the scripting software code block 36 to thereby be capable of interacting with any hardware device, such as the DUT 18, ported to the Mil-Std-1553 bus 20. Consequently, a user can interact with the DUT 18 at any level of desired abstraction. For instance, a user can build the project specific support code component 28 to provide either a simple text-based I/O test method, a mid-level test method with message structures and dispatch functions, or a high level test method using object-oriented programming.

When the user wishes to interact directly with a DUT such as the DUT 18, a simple text-based program offers the most flexibility to manipulate the DUT 18. However, for device characterization, where the same functions are run several times in a prototype environment, a more complex mid-level test is needed with files of pre-written scripts. In a production environment, where the test results are to be independent of the operator, a complex high level test program can assure that each test is completed in a repeatable manor and documented in compliance with company needs. The FAST 30 supports each of these modes of operation with an interface that can smoothly be coupled to the needs of the user.

The scripting software code block 36, which is preferably a group of Tcl files programmed on the hard drive 14, is for enabling the DLL 34 to provide generic support for industry standard bus standard messaging. More specifically, the scripting software code block 36 enables custom functions, such as message creation, logging, timing and bus driver I/O functions, to be added to the DLL 34 to enable a desired test solution to be created without the need to rewrite or recompile the DLL 34. For example, if the results of a test run on the DUT 18 need to be logged to the testing computer 12, the FAST 30 can be extended to log the results to the testing computer 12 through the scripting software code block 36 without necessitating the need to recompile the DLL 34, the Tcl component 24 or the project specific support code component 28.

The DLL layer 34 is a group of support functions written, for example, in C programming language as ASCII text code for calling the driver layer 38 to drive the DUT 18 in response to input test commands. The support functions in the DLL layer 34 can be rewritten and recompiled based on the type of communications bus 20 used. Therefore, the higher context layers of the FAST 30, such as the project specific support code component 28 and the scripting software code block 36, need not be rewritten and recompiled when the type of communications bus is changed.

Figure 4:
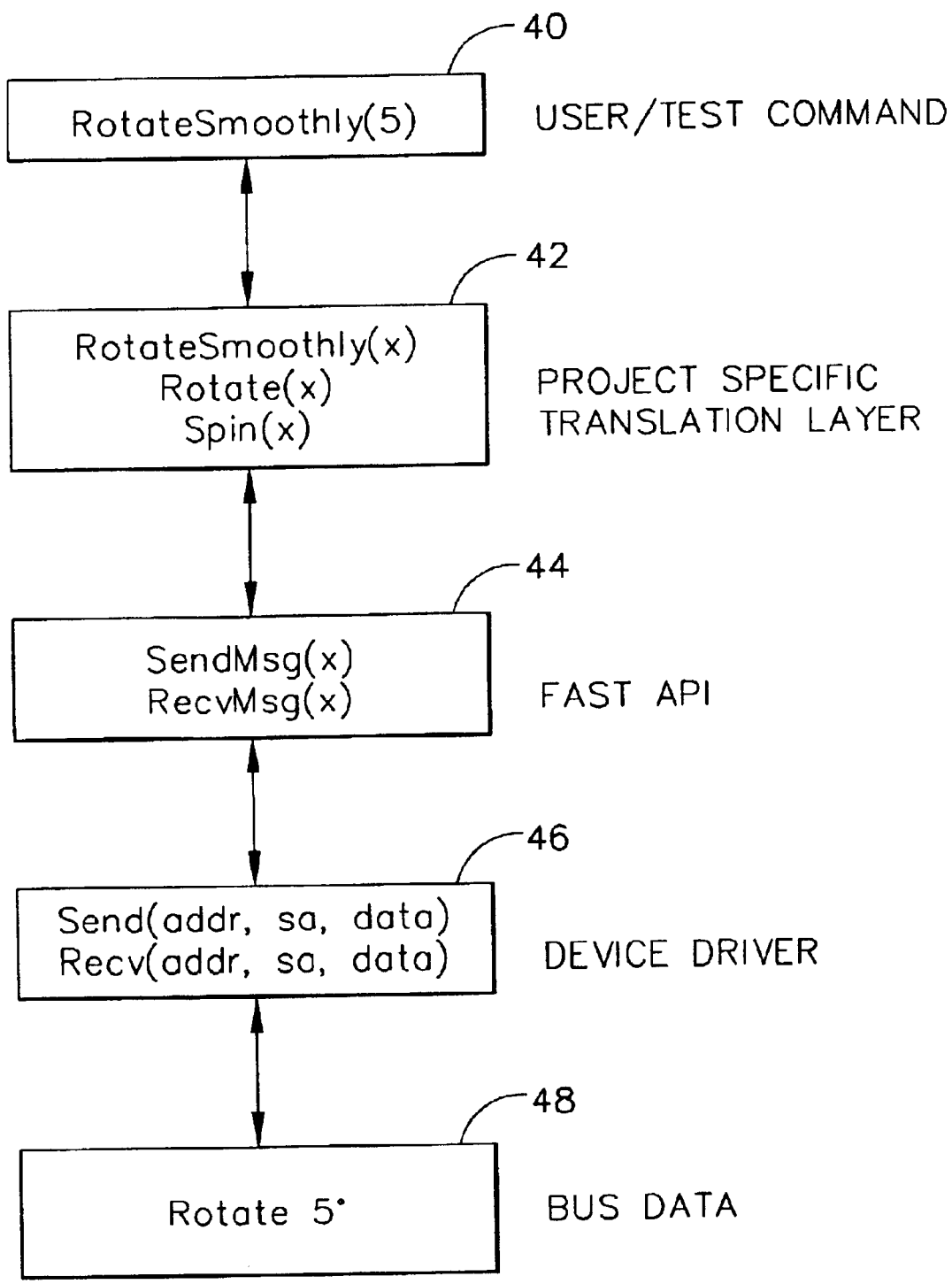
FIG. 4 is a flow diagram illustrating the processing of exemplary input data commands by each of the software modules shown in FIG. 2.

Referring now to FIG. 4, an exemplary test application as implemented by the software components 22 will now be described to illustrate operation of the hardware device testing system, and specifically the FAST 30, according to the present invention. In this particular test application, the hardware device to be tested is a control moment gyro, or CMG, that is mounted on a test platform (not shown) representing a simulated satellite along with sensors (not shown) that verify correct operation of the CMG during testing. At 40, a test application user enters a test command through the users test script or interactive shell 26 to, for example, command the CMG to smoothly rotate the simulated satellite by 5°. The input test command creates a function call at 42 in which the project specific support code component 28 solves corresponding functions stored in its function library for the test command and communicates the results to the FAST 30. As shown, operation of the project specific support code component 28 is not relegated to one action. Rather, its operation could be an amalgamation of many commands, such as the Rotate(x) and Spin(x) commands shown at 42. In addition, the commands could include closed loop feedback feedback commands to slow down rotation of the CMG as the CMG approaches its target position.

At 44, the results transmitted from project specific support code component 28 map the input command to a series of function calls in the FAST 30. The FAST 30 understands these results, calls the appropriate functions from the driver code component 32 and inserts appropriate data into functions stored in the driver code component 32. Therefore, the FAST 30 enables a bus controller environment to be simulated using function libraries at both the FAST 30 and the project specific support code component 28. At 46, the driver code component 32 solves these functions for the data inserted by the FAST 30 and at 48 communicates with the CMG to control the CMG based on the test command input at 40. At 46, the driver code component 32 also sends a message back to the FAST 30 regarding its control of the CMG, and at 44 the FAST 30 passes the message from the driver code component 32 back to the user through the project specific support code 28.

In view of the above discussion, it should be appreciated that the hardware device testing system according to the present invention enables different types of hardware devices to be tested on an industry standard bus, such as a Mil-Std-1553 bus. Only the DLL layer 34 needs to be recompiled when testing is switched from one communications bus to another. Therefore, the hardware device testing system, and particularly the FAST 30, enable the development of flexible and customizable test and simulation programs for the DUT 18 that are simple to operate from a user standpoint.

While the above description is of the preferred embodiment of the present invention, it should be appreciated that the invention may be modified, altered, or varied without deviating from the scope and fair meaning of the following claims.

What is claimed is:

1. A method of programmically communicating with a hardware device, comprising:

receiving test commands;

interpreting the test commands via a project specific support code component written in a scripting language;

providing the project specific support code component with communications capabilities to a bus via an extended scripting language tool which comprises a fast abstract scripting tool, to enable commands to be transmitted over the bus;

transmitting the test commands over the bus; and driving the hardware device based on the project test commands interpreted through the extended scripting language tool and transmitted over the bus.

2. The method of claim 1, further comprising modifying the extended language scripting tool by adding an extension dynamic link library (DLL) thereto to support one or more additional test functions.

3. The method of claim 1, further comprising adding an additional test function to the extended scripting language tool without necessitating recompiling of the extended scripting language tool or the project specific support code component.

4. A system for programmically communicating with a hardware device over a bus, comprising:

a user input for inputting test commands;

a project specific support code component written in a scripting language for interpreting the test commands;

an extended scripting language tool comprising a fast abstract scripting tool for providing communications capabilities from the project specific support code component to the bus to enable the test commands to be transmitted from the project specific support code component over the bus; and a hardware driver compiled in an assembly language for driving the hardware device based on the test commands interpreted through the extended scripting language tool and transmitted from the project specific support code component over the bus.

5. The system of claim 4, wherein the user input is a user test script graphical user interface.

6. The system of claim 4, wherein the fast abstract scripting tool fills in test command message buffers with test command data and variables.

7. The system of claim 4, wherein the fast abstract scripting tool is further for enabling the project specific support code component to communicate with the hardware driver compiled in the assembly language.

8. The system of claim 4, wherein the fast abstract scripting tool includes a dynamic link library (DLL) layer for enabling the fast abstract scripting tool to communicate with the hardware driver on behalf of the project specific support code component.

9. The system of claim 4, wherein the extended scripting language tool is for selectively reading the test commands from the project specific support code component on a line by line basis and for formatting the test commands in a message buffer to enable the test commands to be transmitted over the bus in a bus-specific manner.

10. A fast abstract scripting tool for facilitating testing of a hardware device on an industry standard bus, comprising:

a dynamic link library for abstracting a bus transport and driver layer;

a reconfigurable project specific layer for calling the bus transport and driver layer abstracted in the dynamic link library to drive the hardware device in response to input test commands; and a scripting software code block for enabling the dynamic link library to provide generic support for industry standard bus standard messaging by enabling custom functions to be added to the dynamic link library.

11. The fast abstract scripting tool of claim 10, wherein the reconfigurable project specific layer is the only component modified each time a new hardware device type is to be tested.

* * * * *